(12) United States Patent  
Dilts et al.

(10) Patent No.: US 9,107,349 B2  
(45) Date of Patent: Aug. 18, 2015

(54) SYSTEM AND METHOD FOR CONTROLLING THE SPREADING OF CROP RESIDUE EXPELLED FROM AN AGRICULTURAL COMBINE

(75) Inventors: Mark David Dilts, New Holland, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 236 days.

(21) Appl. No.: 13/600,758

(22) Filed: Aug. 31, 2012

(65) Prior Publication Data

US 2014/0066148 A1 Mar. 6, 2014

(51) Int. Cl.
*A01F 12/30* (2006.01)
*A01F 12/40* (2006.01)
*A01D 41/12* (2006.01)

(52) U.S. Cl.
CPC ............ *A01F 12/40* (2013.01); *A01D 41/1243* (2013.01)

(58) Field of Classification Search
USPC .................................................. 460/111, 112
See application file for complete search history.

(56) References Cited

U.S. PATENT DOCUMENTS

| | | | |
|---|---|---|---|
| 4,056,107 A | 11/1977 | Todd et al. | |
| 4,263,772 A | 4/1981 | Phillips et al. | |
| 4,489,734 A | 12/1984 | Van Overschelde | |
| 5,556,042 A | 9/1996 | Roberg | |
| 6,598,812 B1 | 7/2003 | Matousek et al. | |
| 6,685,558 B2 | 2/2004 | Niermann et al. | |
| 6,719,627 B2 | 4/2004 | Wolters et al. | |
| 6,783,454 B2 | 8/2004 | Bueermann | |
| 6,863,605 B2 | 3/2005 | Gryspeerdt et al. | |
| 7,063,613 B2 * | 6/2006 | Weichholdt | 460/112 |
| 7,066,810 B2 * | 6/2006 | Farley et al. | 460/112 |
| 7,186,179 B1 | 3/2007 | Anderson et al. | |
| 7,220,179 B2 | 5/2007 | Redekop et al. | |
| 7,473,169 B2 * | 1/2009 | Isaac | 460/80 |
| 7,487,024 B2 | 2/2009 | Farley et al. | |
| 7,559,833 B2 | 7/2009 | Isaac et al. | |
| 7,635,299 B2 | 12/2009 | Murray et al. | |
| 7,648,413 B2 * | 1/2010 | Duquesne et al. | 460/112 |
| 7,927,200 B2 | 4/2011 | Van Overschelde et al. | |
| 8,010,262 B2 | 8/2011 | Schroeder et al. | |
| 8,070,570 B2 | 12/2011 | Murray et al. | |
| 2005/0124400 A1 * | 6/2005 | Schmidt et al. | 460/111 |
| 2005/0282602 A1 * | 12/2005 | Redekop et al. | 460/112 |
| 2009/0005137 A1 * | 1/2009 | Isaac et al. | 460/111 |
| 2009/0156277 A1 * | 6/2009 | Benes et al. | 460/112 |
| 2012/0270613 A1 * | 10/2012 | Isaac et al. | 460/111 |

* cited by examiner

*Primary Examiner* — Thomas B Will
*Assistant Examiner* — Mai Nguyen
(74) *Attorney, Agent, or Firm* — Patrick M. Sheldrake; Seyed V. Sharifi T.

(57) ABSTRACT

A system for controlling the spreading of crop residue expelled from an agricultural combine is disclosed. The system may include a spreader configured to expel crop residue from the combine. The spreader may include at least one spreader disc configured to be rotated about an axis. In addition, the system may include a windrow door having an inner surface defining a flow path for directing the crop residue into the spreader. At least a portion of the windrow door may be configured to be moved relative to the spreader so as to adjust a location at which the crop residue is introduced onto the at least one spreader disc.

9 Claims, 12 Drawing Sheets

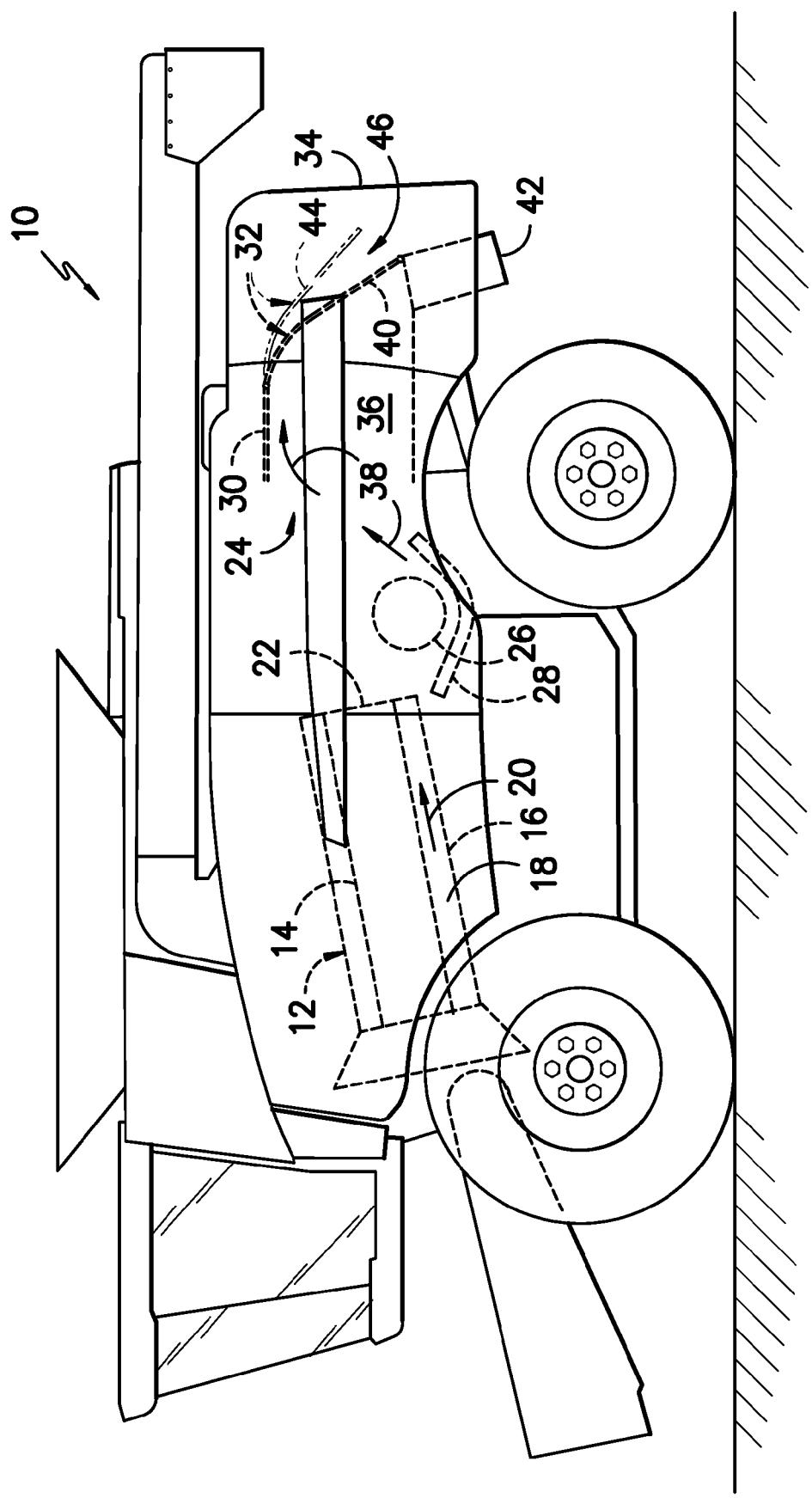
FIG. -1-

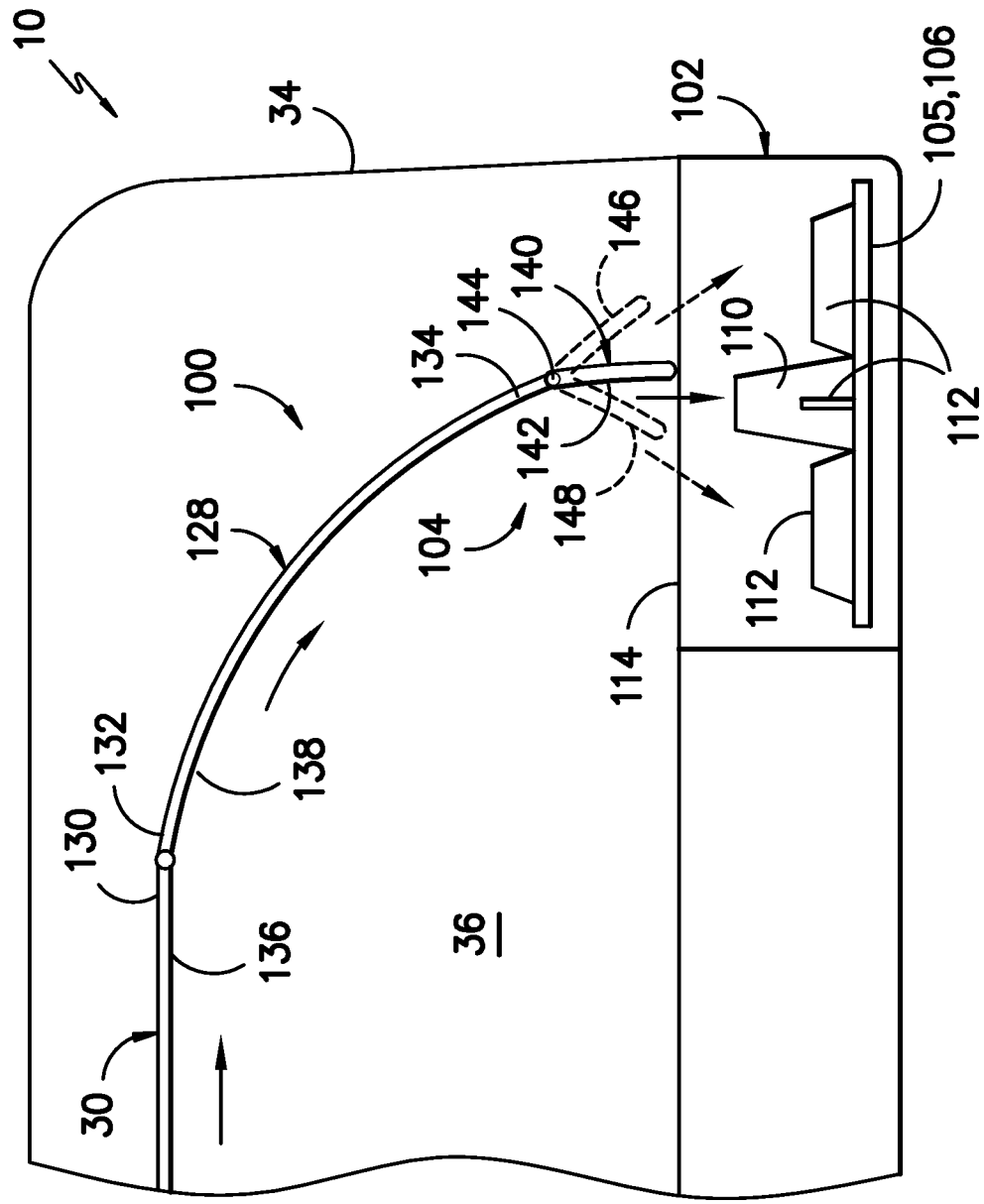
FIG. -2-

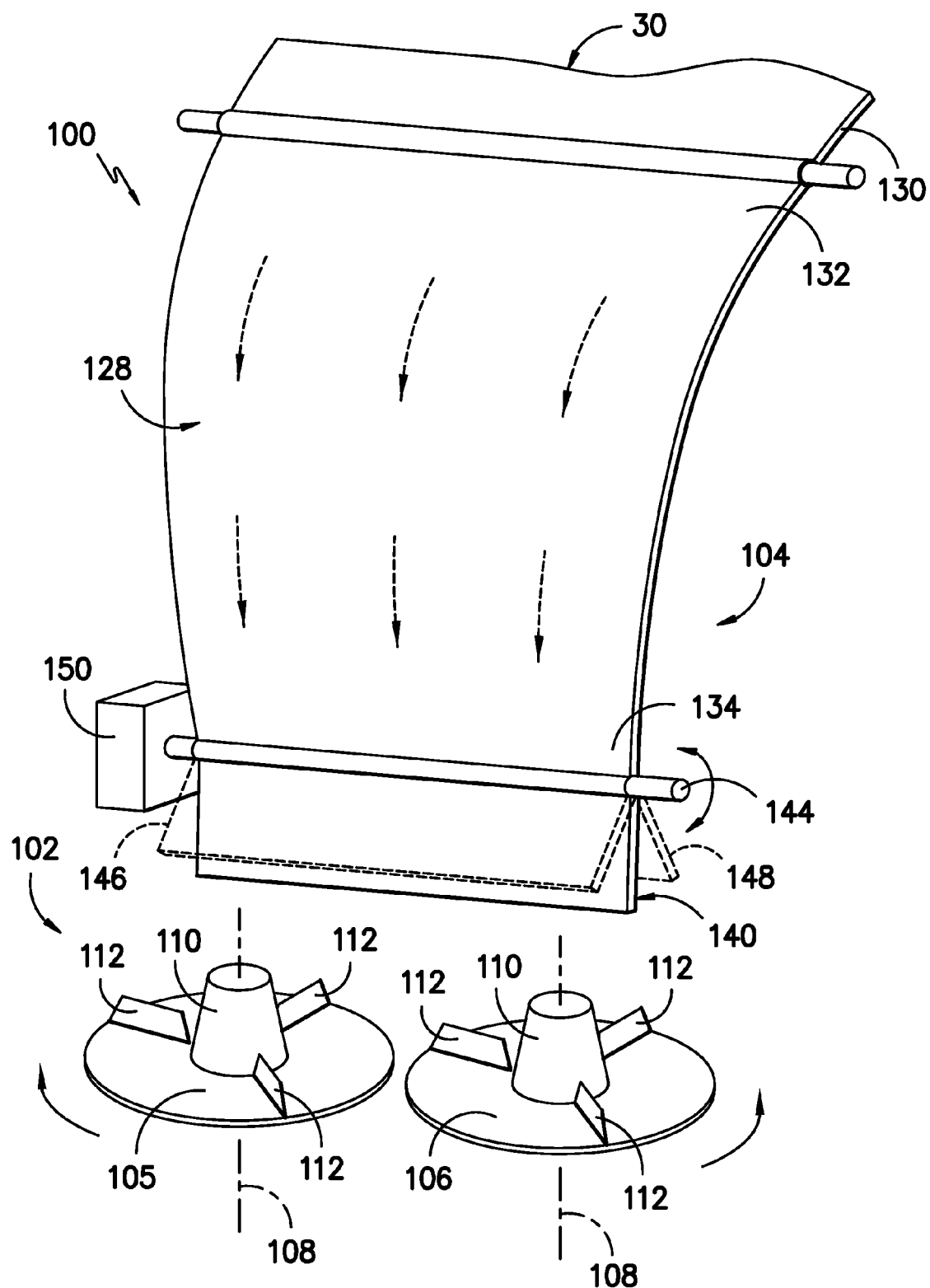
FIG. -3-

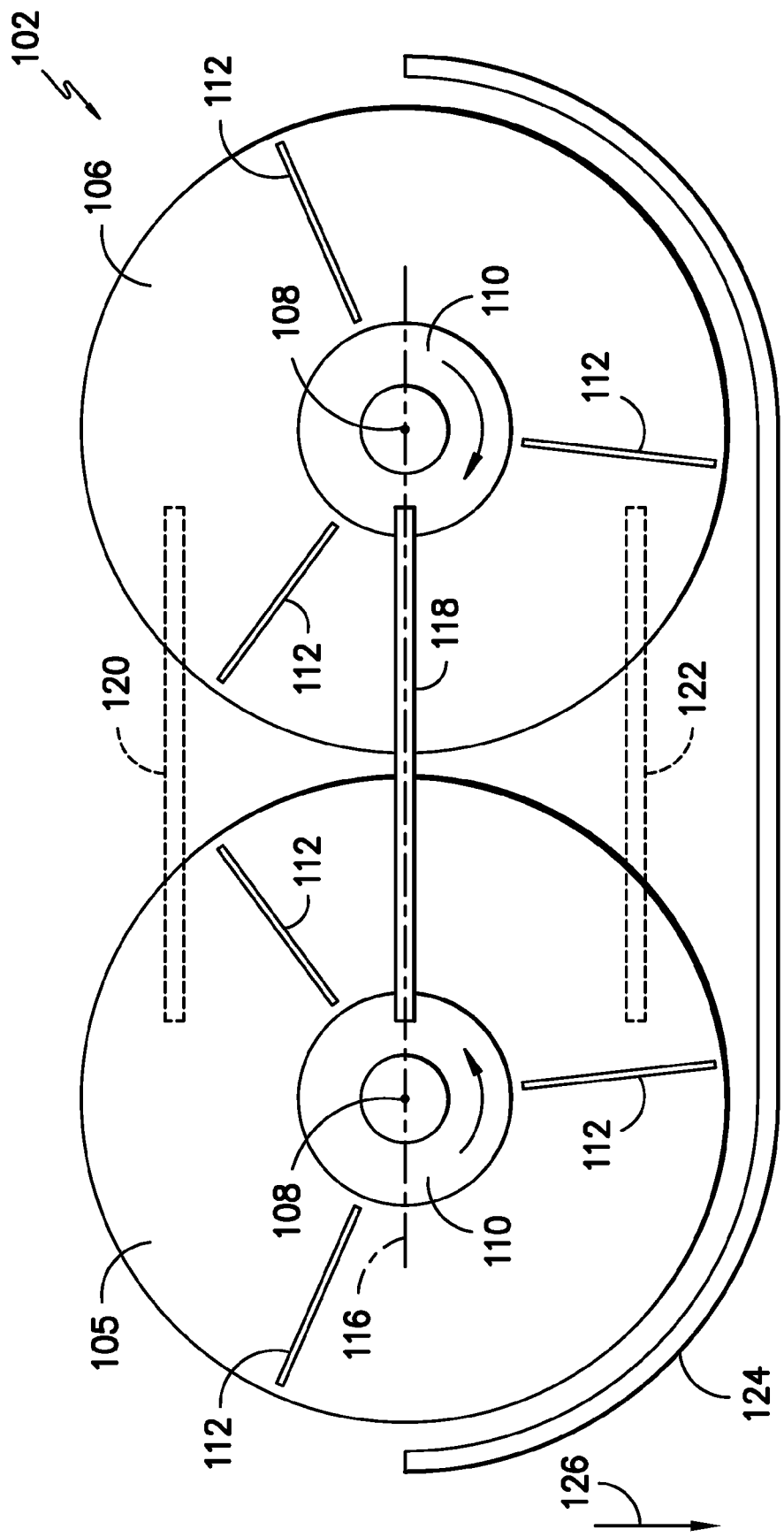
FIG. -4-

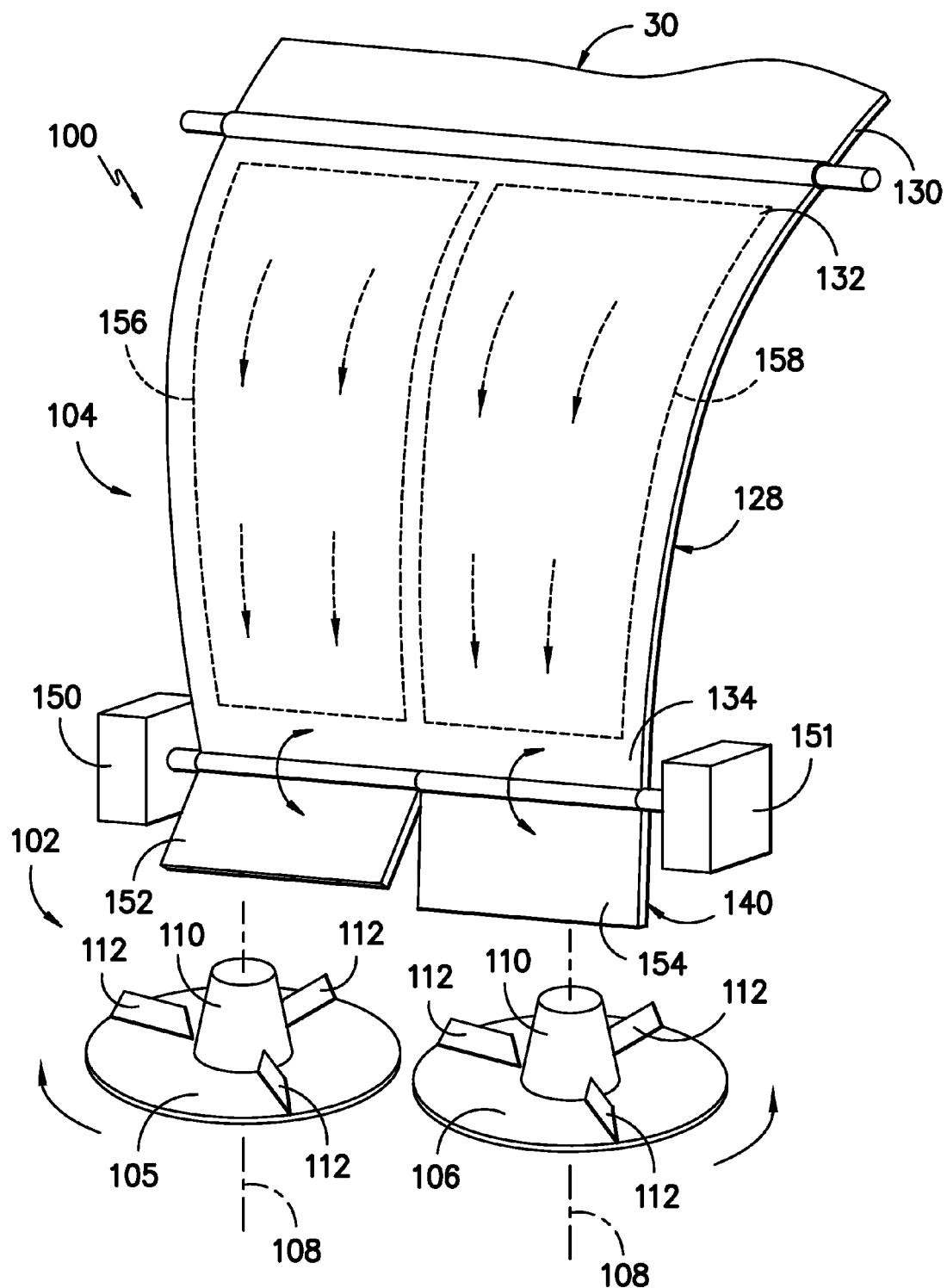
FIG. -5-

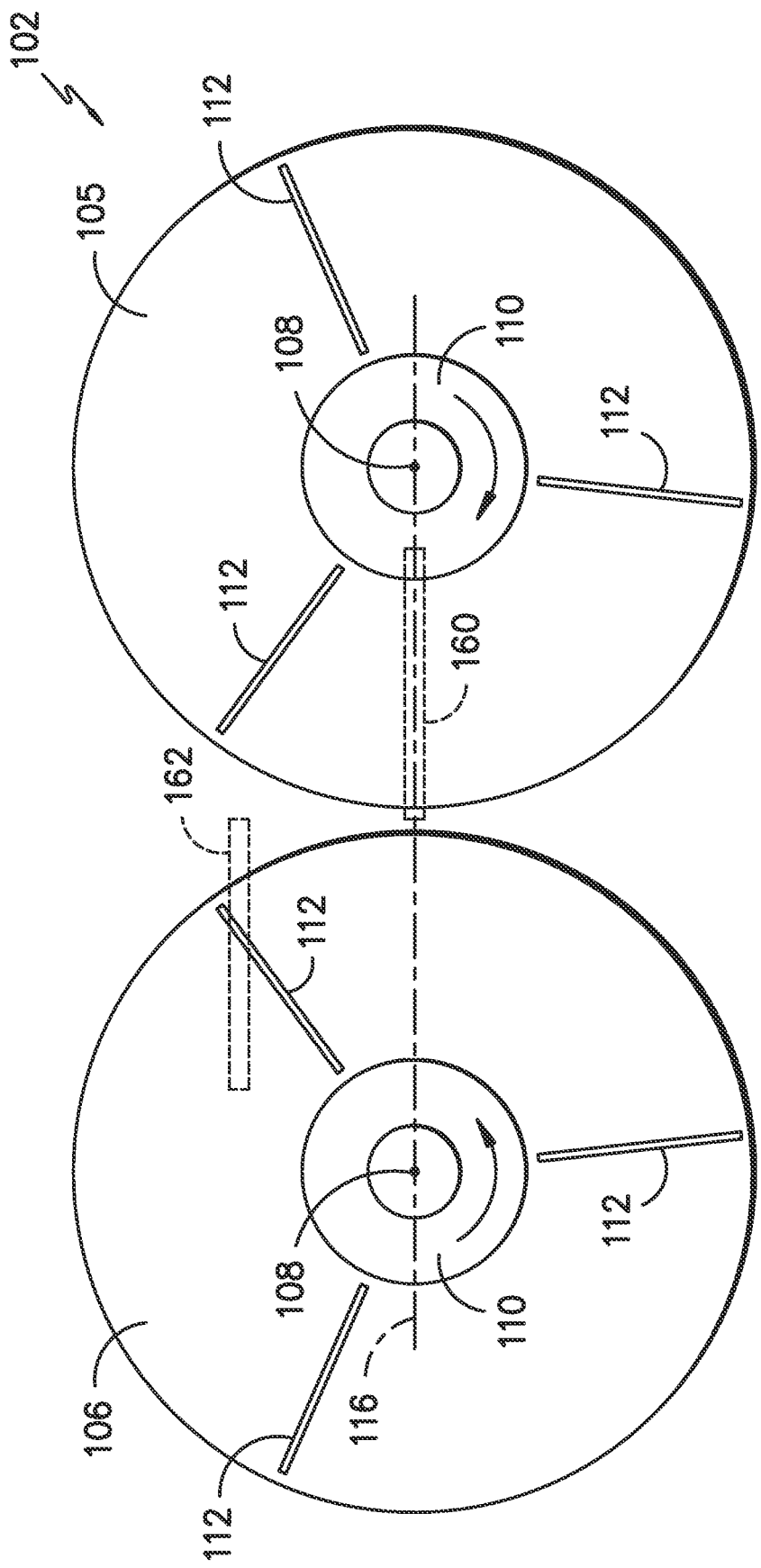
FIG. -6-

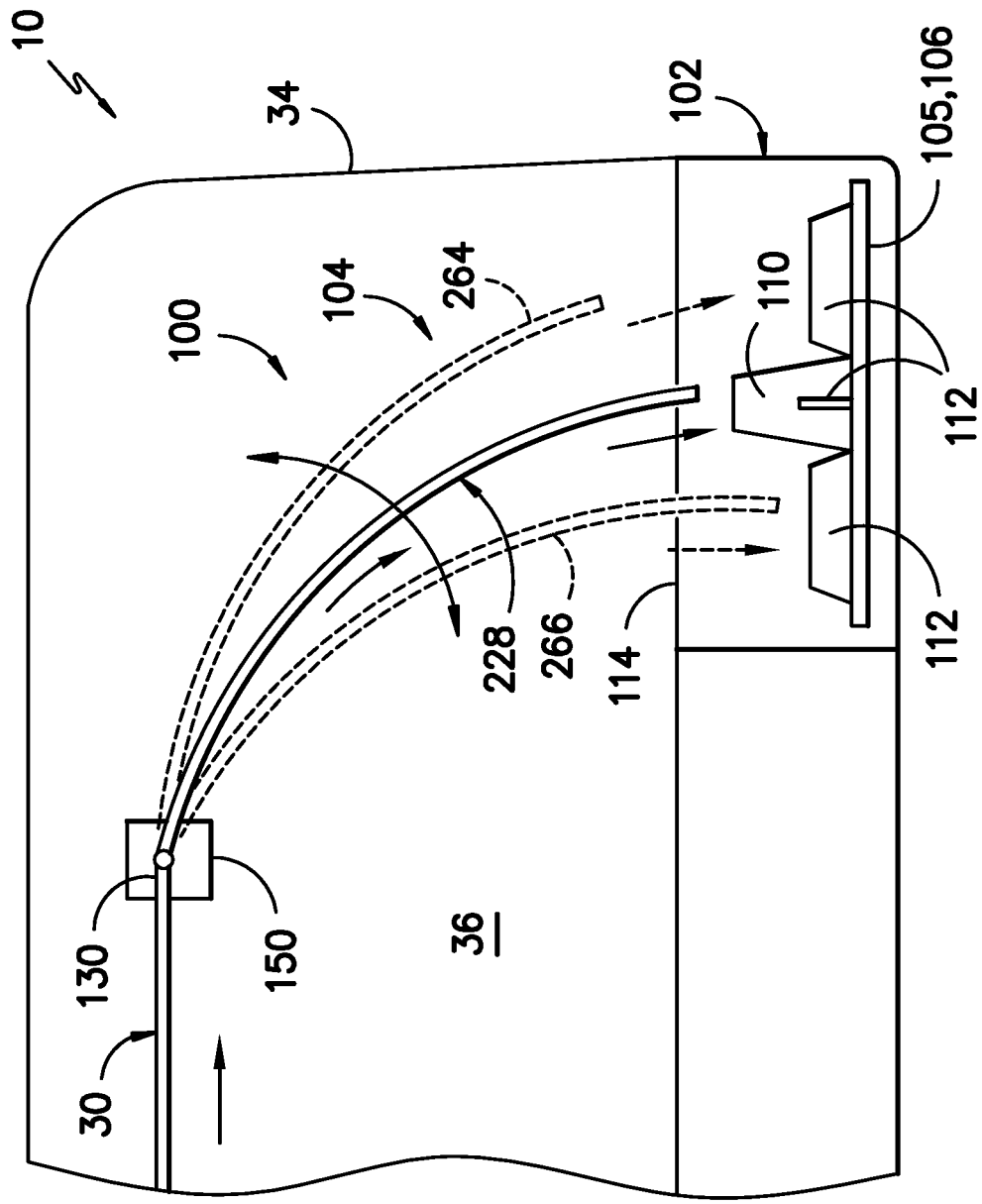
FIG. -7-

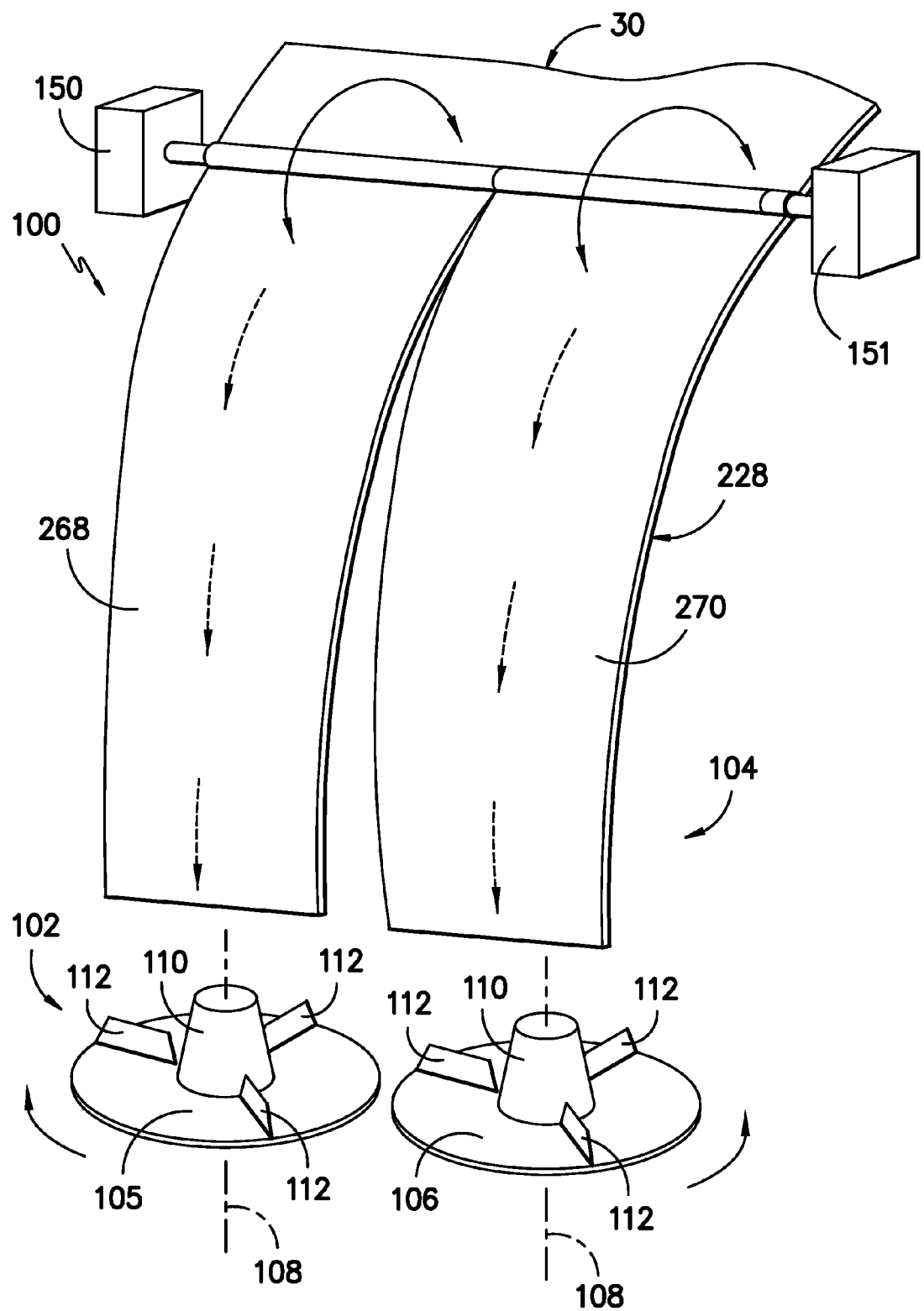
FIG. -8-

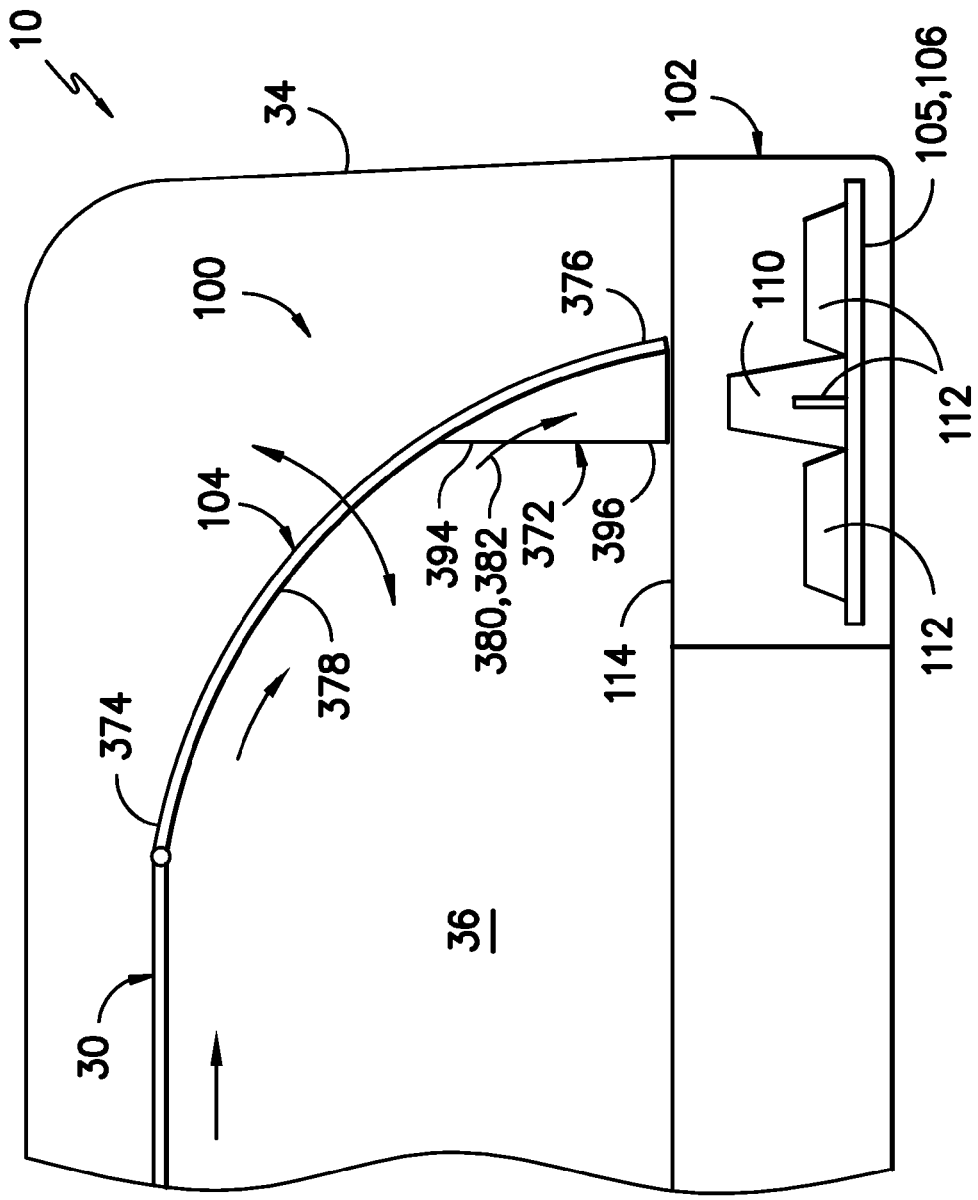
FIG. -9-

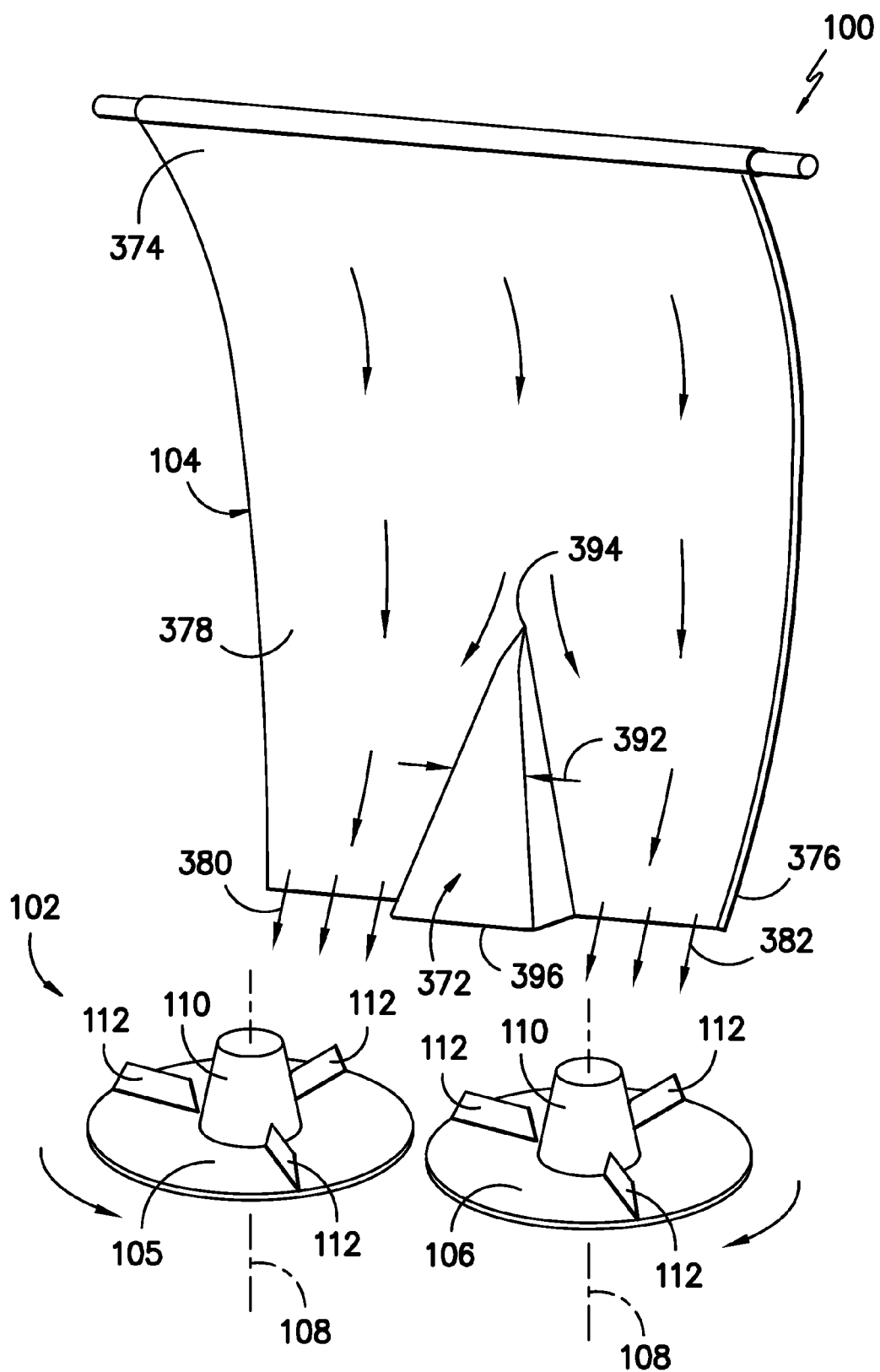
FIG. -10-

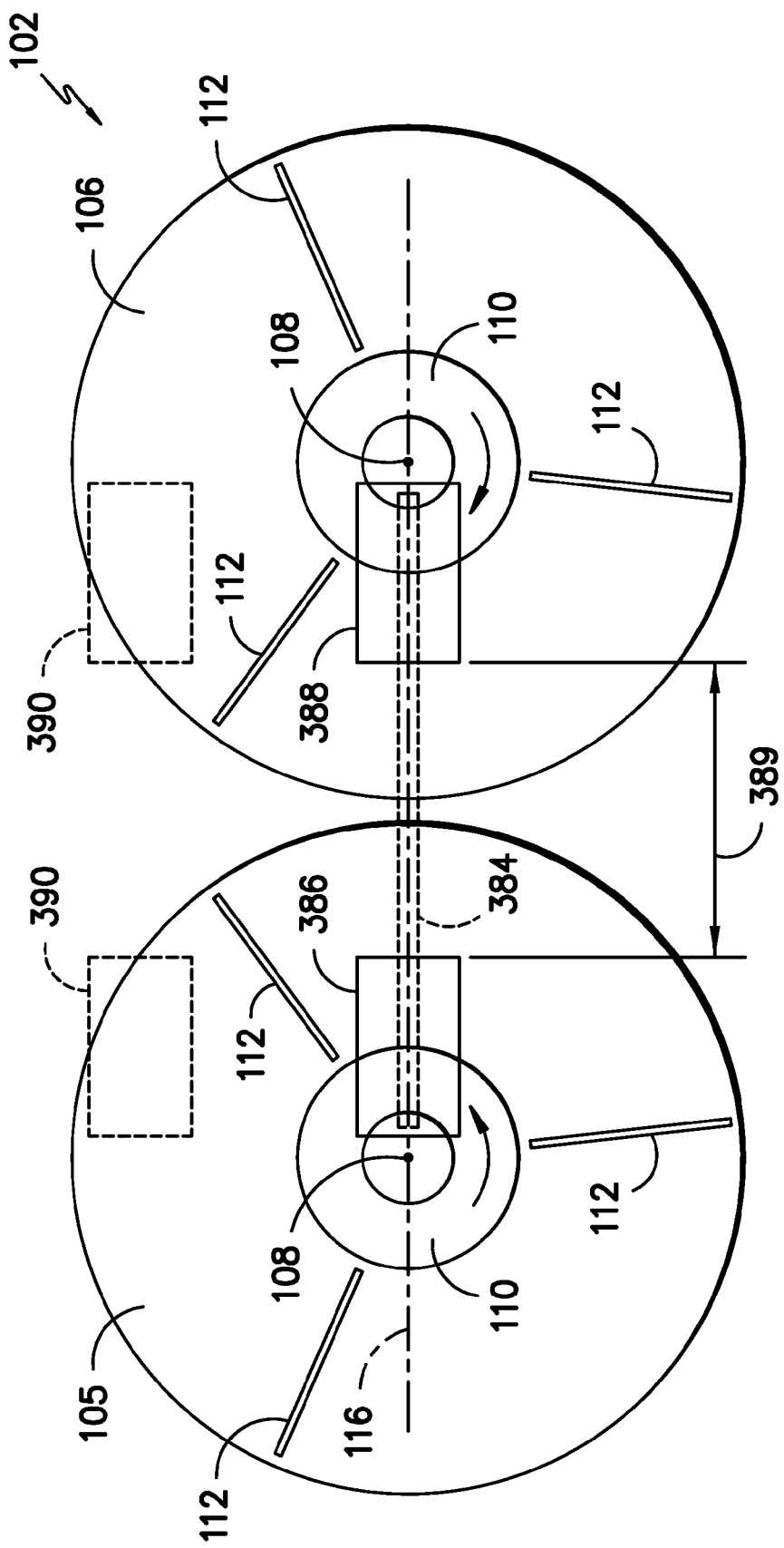
FIG. -11-

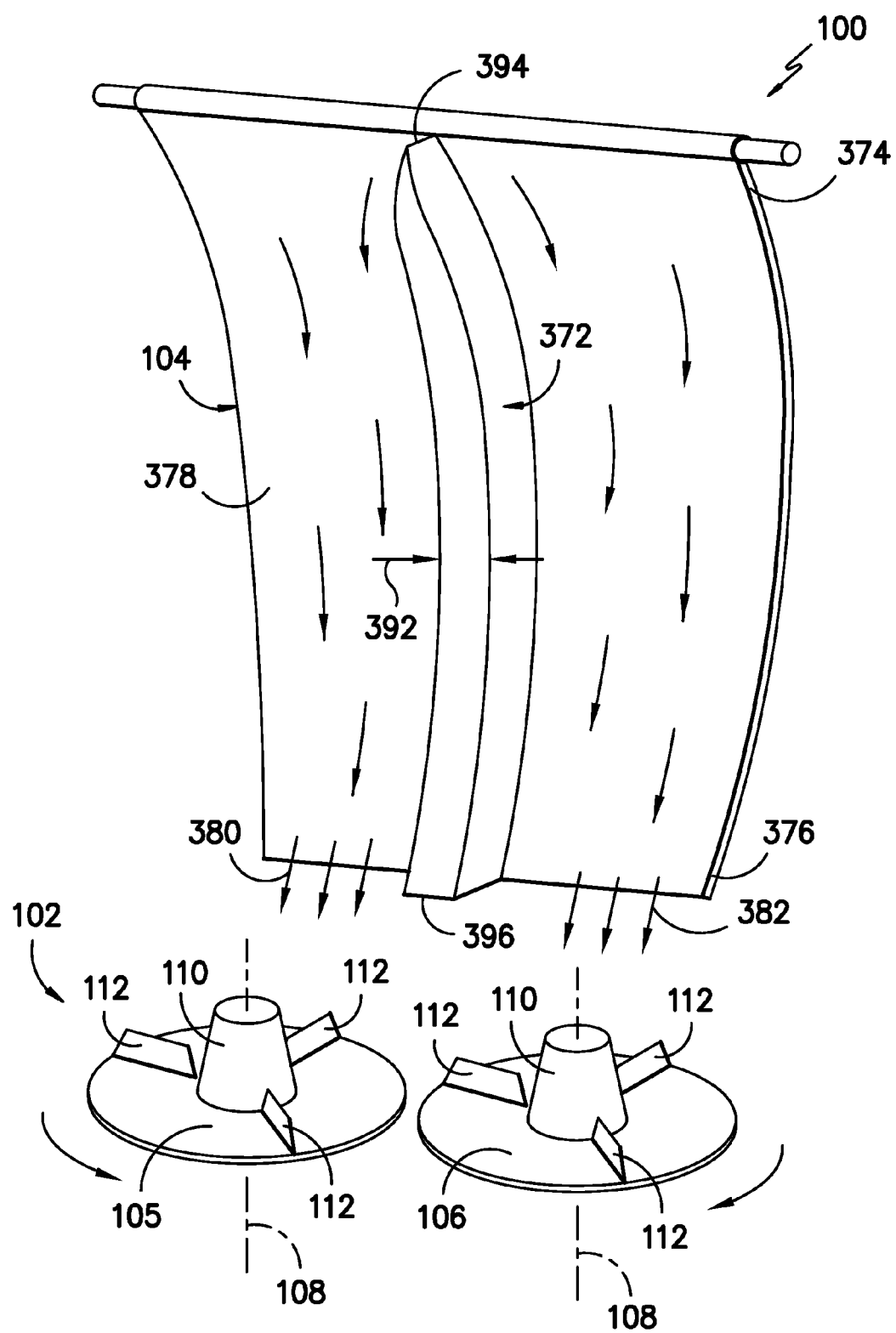
FIG. -12-

SYSTEM AND METHOD FOR CONTROLLING THE SPREADING OF CROP RESIDUE EXPELLED FROM AN AGRICULTURAL COMBINE

FIELD OF THE INVENTION

The present subject matter relates generally to agricultural combines and, more particularly, to a system and method for controlling the spreading of crop residue expelled from a spreader of a combine.

BACKGROUND OF THE INVENTION

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine.

During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor. After discharge from the threshing system, the crop residue is typically directed into a crop residue distribution system located below and rearwardly of the rear end of the rotor. The crop residue distribution system typically includes a rotary beater or chopper or other apparatus that conveys or chops the residue into smaller pieces and propels the crop residue rearwardly towards an area within the rear end of the combine, hereinafter referred to as a distribution chamber. The crop residue provided within the distribution chamber may either be discharged onto a field as a windrow or directed into a spreader mounted on or at the rear end of the combine that is operable for spreading the residue over a swath of the field.

Combines are typically configured to harvest crops with vastly different material properties, which can make it difficult to control the spread distribution and/or spread width of the crop residue discharged from the combine's spreader. For example, light weight crops, such as wheat, create a low density residue which is much more difficult to spread over a large distance than heavier crops, such as corn, that create a relatively dense residue. To accommodate such different material properties, many conventional spreaders include motors configured to rotate the spreader's discs at variable speeds. These motors are typically required to be capable of rotating the spreader discs at a relatively high speed to discharge low density residues widely while also being capable of rotating the spreader discs at a relatively low speed to prevent high density residues from being discharged too widely. As such, the variable-speed motors utilized in such conventional spreaders can be relatively expensive. Moreover, to prevent crop residue from being discharged too widely, the speed settings for the spreader disks must be carefully tailored to match the material properties of the particular crop being harvested, which is often a difficult and time consuming task.

Accordingly, a system and method that is capable of controlling the spread distribution and/or spread width of crop residue without requiring the rotational speed of the spreader discs to be adjusted would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the spreading of crop residue expelled from an agricultural combine. The system may include a spreader configured to expel crop residue from the combine. The spreader may include at least one spreader disc configured to be rotated about an axis. In addition, the system may include a windrow door having an inner surface defining a flow path for directing the crop residue into the spreader. At least a portion of the windrow door may be configured to be moved relative to the spreader to adjust a location at which the crop residue is introduced onto the at least one spreader disc.

In another aspect, the present subject matter is directed to a system for controlling the spreading of crop residue expelled from an agricultural combine. The system may include a spreader configured to expel crop residue from the combine. The system may also include a windrow door having an inner surface defining a flow path for directing the crop residue into the spreader and a residue divider extending from the inner surface. The residue divider may be configured to divide the crop residue flowing along the inner surface into at least two separate residue flows.

In a further aspect, the present subject matter is directed to a method for controlling the spreading of crop residue expelled from an agricultural combine, wherein the combine includes a windrow door and a spreader. The method may include directing a flow of crop residue along the windrow door such that the crop residue is introduced onto a spreader disc of the spreader at a first location and adjusting the direction of flow of the crop residue along the windrow door such that the crop residue is introduced onto the spreader disc at a second location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, side view of one embodiment of an agricultural combine;

FIG. 2 illustrates an interior, side view of one embodiment of a system for controlling the spreading of crop residue expelled from a combine, particularly illustrating a side view of one embodiment of a windrow door and a spreader of the system;

FIG. 3 illustrates a perspective view of the windrow door shown in FIG. 2 and a perspective view of a portion of the spreader shown in FIG. 2;

FIG. 4 illustrates a top view of the portion of the spreader shown in FIG. 3;

FIG. 5 illustrates a perspective view of another embodiment of a system for controlling the spreading of crop residue expelled from a combine, particularly illustrating a perspective view of one embodiment of a windrow door and a portion of the spreader of the system;

FIG. 6 illustrates a top view of the portion of the spreader shown in FIG. 5;

FIG. 7 illustrates an interior, side view of a further embodiment of a system for controlling the spreading of crop residue expelled from a combine, particularly illustrating a side view of one embodiment of a windrow door and a spreader of the system;

FIG. 8 illustrates a perspective view of yet another embodiment of a system for controlling the spreading of crop residue expelled from a combine, particularly illustrating a perspective view of one embodiment of a windrow door and a portion of the spreader of the system;

FIG. 9 illustrates an interior, side view of an even further embodiment of a system for controlling the spreading of crop residue expelled from a combine, particularly illustrating a side view of one embodiment of a windrow door, a spreader and a residue divider of the system;

FIG. 10 illustrates a perspective view of the windrow door and residue divider shown in FIG. 9 and a perspective view of a portion of the spreader shown in FIG. 9;

FIG. 11 illustrates a top view of the portion of the spreader shown in FIG. 10; and FIG. 12 illustrates a perspective view of an alternative embodiment of the residue divider shown in FIGS. 9 and 10.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the spreading of crop residue expelled from an agricultural combine. In several embodiments, the system may include a spreader and a suitable means for adjusting the location at which the crop residue is introduced onto the spreader discs of the spreader. For instance, in one embodiment, at least a portion of the windrow door of the combine may be configured to be moved relative to the spreader, thereby altering the direction of flow of the crop residue as it travels along the windrow door and into the spreader. In another embodiment, a residue divider may be positioned along the inner surface of the windrow door such that the flow of crop residue is divided into at least two separate flows.

It should be appreciated that, by adjusting the location at which the crop residue is introduced onto the spreader discs, the spread distribution and/or spread width of the crop residue may also be adjusted For example, by introducing the crop residue at a location directly between the rotational axes of the spreader discs, the residue may be traveling at a relatively high velocity when it is expelled from the spreader at the outer perimeter of the discs, thereby resulting in a large spread width. However, if the crop residue is introduced onto the spreader discs rearward from the location directly between the rotational axes, a larger portion of the crop residue may initially contact the spreader discs at a radially outer location on the discs. As such, the crop residue may remain on the spreader discs for a shorter period of time prior to being expelled and, thus, may have a lower exit velocity, thereby resulting in a narrower spread width. Furthermore, as the material is discharged with inertia, which carries it in a linear direction at a tangent to the disc at its last point of contact, affecting the point of introduction will affect the tangential point of departure. This provides a second method by which affecting the location of introduction affect the spread distribution.

Referring now to the drawings, FIG. 1 illustrates a simplified, side view of one embodiment of an agricultural combine 10. In general, the combine 10 may be configured the same as or similar to any suitable agricultural combine known in the art. For instance, as shown in FIG. 1, the combine 10 may include an axially arranged threshing system 12. As is generally understood, the threshing system 12 may include a cylindrical rotor 14 rotatably supported within a cage or concave 16 for conveying a flow of crop material in a helical flow path along a circumferential space 18 defined between the rotor 14 and the concave 16. As the crop material is moved through the space 18 towards a rear end 34 of the combine 10 (indicated by arrow 20), the crop (e.g., grain, legumes, and/or the like) may be separated from the residue (e.g., husks, pods and/or the like) and subsequently removed from the threshing system 12. The crop residue may continue along the helical path and may be subsequently discharged through a discharge opening (not shown) defined at a downstream end 22 of the threshing system 12.

In addition, the combine 10 may include a crop residue distribution system 24 for expelling the crop residue from the combine 10. As shown, the distribution system 24 may include a rotary device 26, such as a beater or a chopper, rotatably supported above a concave pan 28. As is generally understood, the rotary device 26 may be configured to be rotated at a rapid speed such that the flow of crop residue exiting the threshing system 12 is propelled rearward along a series of internal shields or panels, such as a guide panel 30 (e.g., a strawhood frame or panel) and a windrow door 32, towards the rear end 34 of the combine 10. For instance, as shown in FIG. 1, the concave pan 28 may be angled in a manner such that the crop residue is propelled rearwardly and upwardly from the rotary device 26 into a distribution chamber 36 wherein the residue is directed along the guide panel 30 towards the windrow door 32 (indicated by arrows 38).

As is generally understood, the top end of the windrow door 32 may generally be configured to be rotatably or pivotally coupled to the guide panel 30. Thus, the windrow door 32 may be rotated relative to the guide panel 30 between a closed position (indicated by dashed lines 40), at which the crop residue flowing through the distribution chamber 36 is directed along the windrow door 32 and into a spreader 42 for swath spreading, and an opened position (indicated by dashed lines 44), at which the crop residue is directed along the windrow door and expelled through a rear opening 46 of the combine 10 for windrowing.

Referring now to FIGS. 2-4, one embodiment of a system 100 for controlling the spreading of crop residue expelled from a combine 10 (FIG. 1) is illustrated in accordance with aspects of the present subject matter. As shown, the system 100 may generally include a spreader 102 configured to expel crop residue from the combine 10 and a windrow door 104 configured to direct the crop residue into the spreader 102 as it flows through the distribution chamber 36 at the rear end 34 of the combine 10.

In general, the spreader 102 may be configured the same as or similar to any suitable spreader known in the art. For example, as shown in FIGS. 2-4, the spreader 102 may be configured as a horizontal spreader and, thus, may include two horizontally oriented spreader discs (e.g., a first spreader disc 105 and a second spreader disc 106) configured to distribute crop residue sideways and rearwardly along a field. As is generally understood, each spreader disc 105, 106 may be configured to be rotated about an axis 108 extending generally perpendicular to the ground. In addition, the spreader 102 may also include a spreader cone 110 extending from the center of each spreader disc 105, 106 (e.g., by aligning the spreader cone 110 coaxially with the rotational axis 108) and a plurality of spreader paddles or tabs 112 extending radially outwardly from each spreader cone 110. However, in alternative embodiments, it should be appreciated that the spreader 102 may have any other suitable configuration that permits it to function as described herein.

During operation, crop residue is directed into the spreader 102 (e.g., via inlet 114) and onto the rotating spreader discs 105, 106. As the spreader discs 105, 106 rotate, the crop residue is accelerated as it slides radially outwardly away from each spreader cone 110 and is subsequently discharged from the spreader 102 at the outer perimeter of each spreader disc 105, 106. Thus, as indicated above, the location at which the crop residue is introduced onto each spreader disc 105, 106 may significantly impact the velocity and the point of tangency at which the residue is expelled from the spreader 102, thereby affecting the spread distribution and/or spread width of the crop residue.

For example, as shown in FIG. 4, when the crop residue is introduced onto the spreader discs 105, 106 between the spreader cones 110 along a reference line 116 extending between the rotational axes 108 of the discs 105, 106 (i.e., central disc location 118 indicated by the solid box), the residue may be in contact with the spreader discs 105, 106 for a longer period of time prior to being expelled than if the crop residue was introduced onto the spreader discs 105, 106 at a location rearward of the reference line 116 (e.g., rear disc location 120 indicated by the dashed box). As such, by adjusting the location at which the crop residue contacts the spreader discs 105, 106 from the central disc location 118 to the rear disc location 120, the crop residue may slide radially outwardly along the spreader discs 105, 106 a shorter distance before being expelled from the spreader 102, thereby reducing the velocity of the expelled crop residue. Similarly, depending on the configuration of the spreader 102, introducing the crop residue onto the spreader discs 105, 106 at a location forward of the reference line 116 (e.g., forward disc location 122 indicated by the dashed box) may also impact the final velocity of the expelled crop residue. For example, as shown in FIG. 4, in one embodiment, the spreader 102 may include a side wall 124 extending along a forward portion of the spreader 102 to prevent crop residue from being expelled in the forward or travel direction of the combine 10 (indicated by arrow 126). Thus, by introducing the crop residue onto the spreader discs 105, 106 at the forward disc location 122, the velocity of the crop residue that is eventually expelled from the rear of the spreader 102 may differ from the velocity achieved when the crop residue is introduced onto the spreader discs 105, 106 at the central disc location 118 or the rear disc location 120.

Referring still to FIGS. 2-4, as indicated above, the disclosed system 100 may also include a windrow door 104 configured to define a flow path for the crop residue traveling between the guide panel 30 and the spreader 102. As will be described in detail below, in several embodiments, at least a portion of the windrow door 104 may be configured to be moved relative to the spreader 102 so as to adjust the location at which the crop residue is introduced onto the spreader discs 105, 106. For example, by adjusting the position of at least a portion of the windrow door 104 relative to the spreader 102, the flow of crop residue may be directed onto the spreader discs 105, 106 at the forward disc location 122, the central disc location 118, the rear disc location 120 or at any other suitable location along the spreader discs 105, 106.

As shown in the illustrated embodiment, the windrow door 104 may include a door panel 128 configured to serve as a guide for the crop residue as it flows past a downstream end 130 of the guide panel 30. For instance, as shown in FIG. 2, the door panel 128 may extend lengthwise between a first end 132 and a second end 134, with the first end 132 of the door panel 128 being coupled to the downstream end 130 of the guide panel 30. As such, an inner surface 136 of the guide panel 30 and an inner surface 138 of the door panel 128 may generally define a substantially continuous flow path for the crop residue flowing within the distribution chamber 36 towards the rear end 34 of the combine 10.

It should be appreciated that, in several embodiments, the door panel 128 may be configured to be rotatably coupled to the downstream end 130 of the guide panel 30. As such, the door panel 128 may be rotated relative to the guide panel 30 in order to alter the direction of flow of the crop residue between the spreader 102 and the rear opening 46 (FIG. 1) of the combine 10. For instance, as shown in FIG. 2, similar to the windrow door 32 described above with reference to FIG. 1, the door panel 128 may be configured to be rotated to a closed position at which the curvature or tangential flow direction of the inner surface 138 of the door panel 128 at its second end 134 is directed towards the spreader 102. Thus, as the crop residue flows past the guide panel 30, it may be directed along the inner surface 138 of the door panel 128 in the direction of the spreader 102. Alternatively, the door panel 128 may be moved to an opened position at which the second end 134 of the door panel 128 is rotated away from the spreader 102 so as to define the rear opening 46 (FIG. 1) of the combine 10. As such, the crop residue flowing along the windrow door 104 may be directed through the rear opening 46 and onto a field as a windrow.

Additionally, the windrow door 104 may also include a deflector panel 140 coupled to the second end 134 of the door panel 128. As such, the deflector panel 140 may generally form an extension of the flow path for the crop residue traveling along the windrow door 104. For instance, as particularly shown in FIG. 2, the deflector panel 140 may be configured to extend from the door panel 128 such that the crop residue flowing past the second end 134 of the door panel 128 is directed along an inner surface 142 of the deflector panel 140 and into the spreader 102. Thus, the inner surfaces 138, 142 of the panels 128, 140 may generally define a continuous flow path for the crop reside as it flows along the windrow door 104 between the guide panel 30 and the spreader 102.

In several embodiments, the deflector panel 140 may be configured to be rotatably coupled to the second end 134 of the door panel 128 to allow the direction of flow of the crop residue to be altered as it enters the spreader 102. For instance, as shown in the illustrated embodiment, the deflector panel 140 may be rotatably coupled to the door panel 128 via a hinge pin 144 or any other suitable hinged and/or or rotational attachment mechanism. As such, the orientation of the deflector panel 140 relative to the door panel 128 and/or the spreader 102 may be adjusted in order to alter the trajectory of the crop residue flowing into the spreader 102.

For example, as shown in FIGS. 2 and 3, the deflector panel 140 may be initially positioned at a location relative to the door panel 128 and/or the spreader 102 so that the crop residue flowing along the inner surface 142 of the deflector panel 140 is directed onto the spreader discs 105, 106 at the central disc location 118 (FIG. 4). However, by altering the orientation of the deflector panel 140, the location at which crop residue is introduced onto the spreader discs 105, 106 may be adjusted. For instance, as shown FIGS. 2 and 3, the deflector panel 140 may be rotated rearward relative to the door panel 128 to a rear deflector position (indicated by dashed lines 146) at which the flow of crop residue is directed along the inner surface 142 of the deflector panel 140 and onto the spreader discs 105, 106 at the rear residue location 120 (FIG. 4). Alternatively, the deflector panel 140 may be rotated forward relative to the door panel 128 to a forward deflector position (indicated by dashed lines 148) at which the flow of crop residue is directed along the inner surface 142 of the deflector panel 140 and onto the spreader discs 105, 106 at the forward residue location 122 (FIG. 4).

It should be appreciated that, in several embodiments, the position of the deflector panel 140 relative to the door panel 128 and/or the spreader 102 may be configured to be manually adjusted. For instance, in one embodiment, the position of the deflector panel 140 may be adjusted by means of a spring-loaded pin (not shown) and/or any other suitable manually adjustable positioning mechanism. In such an embodiment, an operator of the combine 10 may manually adjust the location of the spring-loaded pin and/or other positioning mechanism in order to move the deflector panel 140 relative to the door panel 128 and/or the spreader 102.

Alternatively, the position of the deflector panel 140 may be configured to be automatically adjusted. Specifically, in several embodiments, a suitable electronically controllable actuating device may be operatively coupled to the deflector panel 140. For instance, as shown in FIG. 3, an electric motor 150 may be coupled to the deflector panel 140 at the hinge axis defined between the deflector panel 140 and the door panel 128. In such an embodiment, the electric motor 150 may be coupled to a suitable controller to allow the operator to automatically adjust the position of the deflector panel 140 from within the operator's cab. In further embodiments, any other suitable actuating device, such as a linear actuator, hydraulic or pneumatic cylinder or a mechanical arrangement (e.g., a four bar linkage), may be used to automatically adjust the position of the deflector panels 140.

It should be appreciated that such automatic control of the position of the deflector panel 140 may permit the operator of a combine 10 to make fine-tuned adjustments to the spread distribution and/or spread width of the crop residue as the combine 10 is being operated. For instance, if the current spread width of the crop residue is too narrow, the operator may automatically adjust the position of the deflector panel 140 relative to the door panel 128 and/or the spreader 102 in order to alter direction of the flow of the crop residue into the spreader 102 in a manner that increases the spread width.

Referring now to FIGS. 5 and 6, a variation of the deflector panel 140 shown in FIGS. 2-4 is illustrated in accordance with aspects of the present subject matter. As shown, instead of being configured as a single panel or flap, the deflector panel 140 may comprise two or more deflector flaps 152, 154 extending outwardly from the door panel 128. For example, as shown in FIGS. 5 and 6, the deflector panel 140 may include a first deflector flap 152 and a second deflector flap 154, with each deflector flap 152, 154 being rotatably coupled to the door panel 128. In such an embodiment, the deflector flaps 152, 154 may be configured to be independently rotated relative to the door panel 128 to allow for the direction of flow of the crop residue to be varied across the width of the deflector panel 140.

For example, as shown in FIG. 5, the first deflector flap 152 may be configured to control the direction of flow of a left or first portion of the crop residue (indicated by the dashed box 156) as it is directed along the windrow door 104 and onto the first spreader disc 105. Similarly, the second deflector flap 154 may be configured to control the direction of flow of a right or second portion of the crop residue (indicated by the dashed box 158) as it is directed along the windrow door 104 and onto the second spreader disc 106. Thus, as shown in FIG. 6, by varying the position of the first deflector flap 152 relative to the door panel 128, the location at which the first portion 156 of the crop residue is introduced onto the first spreader disc 105 (indicated by the dashed box 160 in FIG. 6) may be adjusted both radially along the first spreader disc 105 and relative to the location at which the second portion 158 of the crop residue is introduced into the second spreader disc 106 (indicated by the dashed box 162 in FIG. 6).

Such independent control of each deflector flap 152, 154 may generally facilitate even further fine tuning of the spread distribution and/or spread width of the crop residue being expelled from the combine 10. For example, in the event that the spread width of the crop residue needs to be adjusted along the right side of the combine 10 (e.g., the side of the combine 10 along which the second spreader disc 106 is located), the position of the second deflector flap 154 may be adjusted relative to the door panel 128 to alter the location at which the second portion 158 of the crop residue is introduced onto the second spreader disc 106. This may be particularly advantageous, for example, when a road or residential property is located adjacent to the farmland being harvested. In such case, the spread width of the crop residue being expelled along the side of the combine 10 on which the road or residential property is located may be reduced to ensure that the residue is not discharged into the path of a vehicle or onto a neighboring yard.

Additionally, it should be appreciated that, in embodiments in which the deflector flaps 152, 154 are configured to be rotated independent of one another, a separate actuating device may be associated with each deflector flap 152, 154. For example, as shown in FIG. 5, a first electric motor 150 may be coupled to the first deflector flap 152 and a second electric motor 151 may be coupled to the second deflector flap 154. As such, each motor 150, 151 may be separately controlled to adjust the position of each deflector flap 152, 154. Alternatively, the positions of the deflector flaps 152, 154 may be configured to be manually adjusted relative to the door panel 128 and/or relative to one another.

Referring now to FIG. 7, another embodiment of a windrow door 104 that may be utilized to control the location at which crop residue is introduced onto the spreader discs 105, 106 of the spreader 102 is illustrated in accordance with aspects of the present subject matter. As shown, instead of including both a door panel 128 and a deflector panel 140, the windrow door 104 may simply include a door panel 228 rotatably coupled to the downstream end 130 of the guide pane 30. In such an embodiment, the door panel 228 may be configured to be rotated relative to the guide panel 30 across a range of positions in order to adjust the direction of flow of the crop residue into the spreader 102. For example, as shown in the solid lines of FIG. 7, the door panel 228 may be configured to be positioned relative to the spreader 102 such that the flow of crop residue is generally directed between the spreader cones 110 of the spreader 102 (e.g., at the central disc location 118 shown in FIG. 4). Alternatively, the door panel 228 may be rotated rearward (indicated by the dashed lines 264) to direct the flow of crop residue towards the rear of the spreader disks 105, 106 (e.g. at the rear disc location 120 shown in FIG. 4) or the door panel 228 may be rotated forward (indicated by the dashed lines 266) to direct the flow of crop residue towards the front of the spreader disks 105, 106 (e.g. at the forward disc location 122 shown in FIG. 4).

It should be appreciated that, similar to the embodiments described above, the position of the door panel 228 may be configured to be manually or automatically adjusted. For example, as shown in FIG. 7, in one embodiment, a suitable actuating device, such as an electric motor 150, may be coupled to the door panel 228 to allow the position of the panel 228 to be automatically adjusted.

Referring now to FIG. 8, a variation of the door panel 228 shown in FIG. 7 is illustrated in accordance with aspects of the present subject matter. As shown, instead of being configured as a single panel or flap, the door panel 228 may comprise two or more door flaps 268, 270 rotatably coupled to the guide panel 30. For example, as shown in the illustrated embodiment, the door panel 228 may include a first door flap 268 and a second door flap 270, with each door flap 268, 270 being configured to be independently rotated relative to the guide panel 30. As such, similar to the deflector flaps 152, 154 described above, the position of each door flap 268, 270 may be adjusted relative to guide panel 30 and/or relative to the other door flap 268, 270 in order to vary the direction of flow of the crop residue across the width of the door panel 228. For example, as shown in FIG. 8, the position of the first deflector flap 258 may be varied (e.g., via a first motor 150) to control the location at which the crop residue is introduced onto the first spreader disc 105 while the position of the second deflector flap 260 may be varied (e.g., via a second motor 151) to control the location at which the crop residue is introduced onto the second spreader disc 106.

It should be appreciated that, as an alternative to rotating at least a portion of the windrow door 104 relative to the spreader 102, at least a portion of the windrow door 104 may be configured to be deflected to control the location at which the crop residue is introduced onto the spreader discs 105, 106. For example, in several embodiments, the windrow door 104 (or a portion thereof, such as the door panel 128, 228 or deflector panel 140) may be made of a lightweight, flexible material (e.g., a flexible plastic or other polymer material) that is capable of being flexed or deflected in order to adjust the shape and/or orientation of the windrow door 104 relative to the spreader 102. In such an embodiment, a suitable actuating device, such as a linear actuator or cylinder, may be utilized to deflect the windrow door 104 relative to the spreader 102.

Referring now to FIGS. 9-12, in addition to configuring at least a portion of the windrow door 104 to be movable relative to the spreader 102 or as an alternative thereto, the disclosed system 100 may also include a residue divider 372 configured to separate the flow of crop residue along the windrow door 104 into two or more separate residue flows. In such embodiments, the windrow door 104 may generally be configured the same as or similar to any of the windrow door configurations described above with references to FIGS. 2-8 or the same as or similar to any conventional windrow door known in the art. For example, as shown the illustrated embodiment, the windrow door 104 may generally be configured to extend lengthwise between a first end 374 and a second end 376 and may include an inner surface 378 defining a generally continuously flow path for the crop residue flowing along the windrow door 104 between the guide panel 30 and the spreader 102.

Additionally, as shown in the illustrated embodiment, the residue divider 372 may generally be configured to project outwardly from the inner surface 378 of the windrow door 104 so as to separate the flow of crop residue directed along the inner surface 378 into a first a residue flow 380 and a second residue flow 380. Such division of the crop residue into separate flows may generally allow for the residue to be introduced onto the spreader discs 105, 106 at more focused locations, thereby providing for increased control of the spread distribution and/or spread width of the crop residue.

For example, as shown in FIG. 11, in the absence of the residue divider 372, the crop residue may be configured to be introduced onto the spreader discs 105, 106 at a central disc location (indicated by the dashed box 384) generally spanning the gap defined between the rotational axes 108 of the discs 105, 106. However, by dividing the crop residue into separate residue flows 380, 382, the residue may be directed onto specific areas of the spreader discs 105, 106. For example, as shown in FIG. 11, in one embodiment, the first residue flow 380 may be focused onto a location adjacent to the rotational axis 108 of the first spreader disk 105 (indicated by the box 386) and the second residue flow 382 may be focused onto a location adjacent to the rotational axis 108 of the second spreader disc 106 (indicated by box 388). In such an embodiment, by introducing a larger portion of the crop residue closer to the rotational axes 108 of the spreader discs 105, 106, the majority of the crop residue must slide radially outwardly along the discs 105, 106 a further distance prior to being expelled from the spreader 102, thereby increasing the velocity of the expelled crop residue.

In other embodiments, it should be appreciated that the residue divider 372 may be utilized to direct the crop residue onto any other suitable locations along the spreader discs 105, 106. For instance, by adjusting the location of the windrow door 104 relative to the spreader 102, the first and second residue flows 380, 382 may be directed onto radially outer portions of the spreader discs 105, 106 (indicated by the dashed boxes 390), thereby resulting in a decrease in the velocity of the expelled crop residue. Similarly, by adjusting the position of the residue divider 372 along the length of the windrow door 104, a split distance 389 (FIG. 11) defined between the residue flows 380, 382 may be increased or decreased. For example, by moving the position of the residue divider 372 shown in FIGS. 9 and 10 to a location closer to the first end 374 of the windrow door 104, the split distance 389 defined between the residue flows 380, 382 may be increased.

It should be appreciated that the residue divider 372 may generally have any suitable configuration that permits it to function as described herein. For example, in several embodiments, the residue divider 372 may be wedge or pyramid-shaped and, thus, may define a diverging width 392. Specifically, as shown in FIG. 10, the residue divider 372 may be configured to extend lengthwise between an upstream end 394 and a downstream end 396, with the width 392 of the divider 372 diverging between the upstream and downstream ends 392, 396. Alternatively, as shown in the embodiment of FIG. 12, the residue divider 372 may be configured to define a relatively constant width 392 between its upstream and downstream ends 394, 396.

Additionally, in several embodiments, the residue divider 372 may be configured to extend lengthwise any suitable distance between the first and second ends 374, 376 of the windrow door 104. For example, as shown in FIGS. 9 and 10, in one embodiment, the divider 372 may extend only partially between the first and second ends 374, 376 of the windrow door 104. Alternatively, as shown in the embodiment of FIG. 12, the divider 372 may be configured to extend fully between the first and second ends 374, 376 of the windrow door 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system that controls spreading of crop residue expelled from an agricultural combine, the system comprising:
a spreader configured to expel crop residue from the combine, the spreader including a spreader disc configured to be rotated about an axis; a windrow door including an inner surface defining a flow path for directing the crop residue into the spreader, the windrow door positioned between a chopper of the agricultural combine and the spreader disc to convey crop residue onto the spreader, wherein at least a portion of the windrow door is configured to be moved relative to the spreader so as to adjust a location at which the crop residue is introduced onto the spreader disc, the windrow door comprises a door panel and a deflector panel coupled to the door panel, the deflector panel being configured to be moved relative to the door panel to adjust the location at which the crop residue is introduced onto the spreader disc the deflector panel comprises a first deflector flap and a second deflector flap, wherein the first deflector flap is configured to be moved relative to the door panel independent of the second deflector flap.

2. The system of claim 1, wherein the at least a portion of the windrow door is configured to be moved relative to the spreader such that the location at which the crop residue is introduced onto the spreader disc is adjusted radially outwardly from the axis.

3. The system of claim 1, further comprising an actuating device coupled to the deflector panel, the actuating device configured to move the deflector panel relative to the door panel.

4. A system that controls spreading of crop residue expelled from an agricultural combine, the system comprising:
a spreader that expels crop residue from the agricultural combine;
a windrow door including an inner surface to define a flow path that directs the crop residue into the spreader; the windrow door positioned between a chopper and the spreader to convey crop residue onto the spreader, and the windrow door comprises a door panel coupled to a guide panel of the combine, the door panel being configured to be moved relative to the guide panel to adjust the location at which the crop residue is introduced onto the spreader disc; the door panel comprises a first door flap and a second door flap, the first door flap is configured to be moved relative to the guide panel independent of the second door flap.

5. The system of claim 4, wherein windrow door extends lengthwise between a first end and a second end.

6. The system of claim 4, further comprising an actuating device coupled to the deflector panel, the actuating device configured to move the deflector panel relative to the door panel.

7. A method of controlling spreading crop residue expelled from an agricultural combine, the combine including a windrow door and a spreader, the method comprising:
directing a flow of crop residue along the windrow door such that the crop residue is introduced onto a spreader disc of the spreader at a first location; the windrow door positioned between a chopper of the agricultural combine and the spreader disc for conveying crop residue onto the spreader;
the windrow door comprises a door panel and a deflector panel coupled to the door panel, the deflector panel being configured to be moved relative to the door panel to adjust the location at which the crop residue is introduced onto the spreader disc the deflector panel comprises a first deflector flap and a second deflector flap, wherein the first deflector flap is configured to be moved relative to the door panel independent of the second deflector flap;
and
adjusting the direction of flow of the crop residue along the windrow door such that the crop residue is introduced onto the spreader disc at a second location.

8. The method of claim 7, further comprising an actuating device coupled to the deflector panel, the actuating device configured to move the deflector panel relative to the door panel.

9. The method of claim 7, further comprising dividing the flow of crop residue into at least two separate residue flows along the inner surface of the windrow door.

* * * * *